United States Patent [19]

Mohtashemi et al.

[11] Patent Number: 5,684,865
[45] Date of Patent: Nov. 4, 1997

[54] METHOD FOR EFFICIENT FACSIMILE COMMUNICATION WITH SELECTIVE CALL RECEIVERS

[75] Inventors: Mojdeh Mohtashemi; Ali Saidi, both of Atlanta, Ga.

[73] Assignee: Motorola, Inc., Schaumburg, Ill.

[21] Appl. No.: 520,069

[22] Filed: Aug. 28, 1995

[51] Int. Cl.$^6$ .................................................. H04M 11/00
[52] U.S. Cl. ........................... 379/100; 379/57; 379/96; 358/407; 358/426; 358/261.1
[58] Field of Search .......................... 379/100, 98, 96, 379/93, 56, 57, 58; 358/426, 261.2, 427, 433, 434, 442, 401, 400, 407

[56] References Cited

U.S. PATENT DOCUMENTS

| | | |
|---|---|---|
| 4,809,297 | 2/1989 | Polansky et al. . |
| 4,933,770 | 6/1990 | DeSpain . |
| 5,023,905 | 6/1991 | Wells et al. . |
| 5,398,115 | 3/1995 | Lin ........................................ 379/100 |
| 5,420,692 | 5/1995 | Lin et al. . |
| 5,422,733 | 6/1995 | Merchant et al. ........................ 379/58 |
| 5,459,482 | 10/1995 | Orlen ........................................ 379/98 |
| 5,495,344 | 2/1996 | Callaway, Jr. et al. .................... 379/57 |
| 5,566,001 | 10/1996 | Saidi et al. ................................ 358/426 |

*Primary Examiner*—Stella Woo
*Attorney, Agent, or Firm*—Keith A. Chanroo

[57] ABSTRACT

A selective call system (10) transmits efficiently encoded and compressed facsimile communication to at least one FAX selective call receiver (40). The selective call system (10) receives a subscriber identification number and a FAX message, decodes and expands the FAX message, and then Efficiently Encodes and Compresses (EEC) the FAX message data for inclusion in a selective call FAX message. The selective call system (10) then transmits the selective call FAX message destined for reception by at least one FAX selective call receiver (40). The at least one FAX selective call receiver (40) receives the selective call FAX message, and efficiently decodes and expands the EEC FAX message from the selective call FAX message to present the FAX message to a user of the FAX selective call receiver (40), such as via a display (90).

11 Claims, 10 Drawing Sheets

AT RESOLUTION X

RUN-LENGTH = 1

AT RESOLUTION 2X

RUN-LENGTH = 2

| RUN LENGTH | WHITE RUNS CODE | BLACK RUNS CODE |
|---|---|---|
| 0 | 00110101 | 0000110111 |
| 1 | 000111 | 010 |
| 2 | 0111 | 11 |
| 3 | 1000 | 10 |
| 4 | 1011 | 011 |
| ⋮ | ⋮ | ⋮ |

| REMAINDER | CODE |
|---|---|
| 0 | 0 |
| 1 | 1 |

K = 3

| REMAINDER | CODE |
|---|---|
| 0 | 00 |
| 1 | 01 |
| 2 | 10 |

K = 4

| REMAINDER | CODE |
|---|---|
| 0 | 00 |
| 1 | 01 |
| 2 | 10 |
| 3 | 11 |

K = 5

| REMAINDER | CODE |
|---|---|
| 0 | 000 |
| 1 | 001 |
| 2 | 010 |
| 3 | 011 |
| 4 | 100 |

*FIG. 11*

METHOD FOR EFFICIENT FACSIMILE COMMUNICATION WITH SELECTIVE CALL RECEIVERS

FIELD OF THE INVENTION

This invention relates in general to facsimile communications and more specifically to a method for providing facsimile communication with selective call receivers.

BACKGROUND OF THE INVENTION

Contemporary selective call communication systems, e.g., paging systems, employ messaging schemes that can deliver voice, numeric, or alphanumeric messages to users. The majority of selective call systems transmit address and message information using a protocol such as GSC (Motorola's Golay Sequential Code) or POCSAG (Great Britain's Post Office Code Standardization Advisory Group). To originate a message or page, a base station (or selective call terminal) is typically accessed via a Public Switch Telephone Network (PSTN) from a telephone. As a voice message entry device, the telephone is acceptable but when data needs to be entered, an alternative means of entry is desirable. Alternative entry devices such as computer terminals or custom entry devices work well if an originator can convey information to the user in a text format.

Unfortunately, when an originator must convey a large amount of information or graphics-type information, such as is typical for conventional facsimile messaging systems, existing selective call messaging systems and data transport protocols do not gracefully allow for the transmission of either very long textual messages or messages containing large amounts of graphical data. This is because, in a first place, selective call receivers are powered by limited energy content battery supplies that are quickly degraded when receiving and displaying very long messages. Secondly, very long messages are more likely to be interfered with or corrupted during wireless communication, making effective communication more difficult. Thirdly, the miniature size and significant cost constraints of modern selective call receivers require that memory devices for storing received information be as small and inexpensive as possible to make the system commercially viable.

Conventional methods for compressing facsimile dam consist of computing black run-lengths and white run-lengths of scan lines within bit images. The black and white run-lengths are then coded according to a Modified Huffman Coding procedure defined under the Consultative Committee on International Telegraph and Telephone (CCITT) Group 3 standard protocol. This compression procedure utilizes a codebook that is stored in a memory, such as a codebook 200 illustrated for example in FIG. 3, to replace each black or white run-length with a representative code from the codebook 200. The codes are mapped to run-lengths in the codebook 200 according to an observed probability of occurrence of certain run-length patterns in facsimile data images. The more frequent the occurrence of a pattern, the smaller the representative code in the code book 200. Huffman coding can result in an efficient compression of a facsimile data image when the selected probabilities of the codes mapped to run-lengths in the codebook 200 match exactly with the actual probability distribution for run-length patterns in an actual facsimile data image. A close approximation of the probability distributions between the codebook 200 and the occurrence of run-length patterns in an actual facsimile data image would also result in an acceptable data compression.

Unfortunately, the probability distributions for run-length patterns vary for images with different resolutions. One Huffman code book would not efficiently compress facsimile data images for many different resolutions. For example, referring to FIG. 1, an image element 101 is shown at a resolution X, e.g., at a fifty-dots-per-inch (DPI) resolution. Here, a scan line 102 across the image element 101 results in a black run-length 104 computed at 1. Referring to FIG. 2, an image element at a resolution 2X, e.g., at a one hundred DPI resolution, the graphic element 101 is represented at a scan line 106 by a black run-length 108 computed at 2. If the run-length of 1 has the highest probability of occurrence under a resolution X, the run-length of 2 will have the highest probability of occurrence at a resolution 2X. Therefore, if a single codebook is designed for use at both resolutions, e.g., at resolution X and resolution 2X, it is clear in this example that if either run-length is selected as the highest probability of occurrence for one resolution then at the other resolution the data compression procedure will suffer inefficiency.

For example, referring again to FIG. 3, the exemplary codebook 200 shown defines a run-length of one 120 for a black run 122 with a code of three binary digits "010". On the other hand, the run-length of two 124 for a black run 126 is defined with a code of two binary digits "11". This codebook 200 favors the occurrence of a black run-length of two over a black run-length of one. Therefore, a compression procedure utilizing the exemplary codebook 200 of FIG. 3 on the exemplary image element 101 of FIG. 1 would result in a more efficient compression of a scan line at resolution 2X than at resolution X. If the occurrence of the black run-length of one was very high in a facsimile data image scanned at resolution X, the compression of the facsimile data image utilizing the codebook 200 of FIG. 3 would be inefficient, resulting in a large message data to be transmitted to a selective call receiver. As discussed above, this type of inefficiency is undesirable for wireless transmission of messages in selective call communication systems.

Thus, what is needed is a method and apparatus, in a selective call communication system, for providing efficient communication of messages comprising graphical or facsimile data.

BRIEF DESCRIPTION OF THE DRAWINGS

FIG. 3 is a prior art code book illustrating a modified Huffman Code Table such as may be utilized for compressing facsimile data under the CCITT Group 3 standard protocol.

FIG. 11 is a set of exemplary remainder code books for compressing and expanding facsimile data in accordance with a preferred embodiment of the present invention.

DESCRIPTION OF A PREFERRED EMBODIMENT

Figure 1:
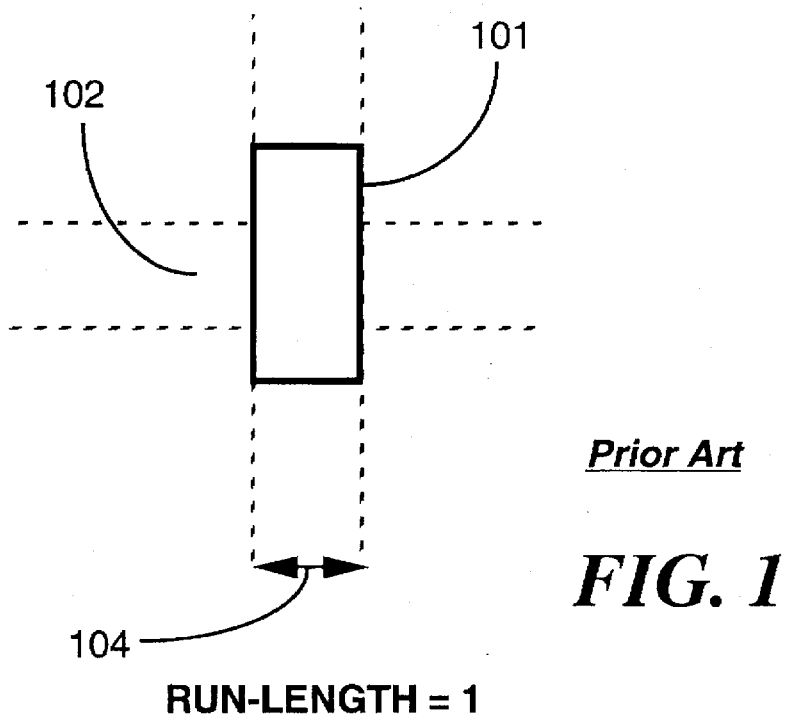
FIGS. 1 and 2 are prior art image elements, first represented at a resolution X, e.g., fifty dots per inch, and then represented at a resolution 2X, e.g., one hundred dots per inch.
Figure 2:
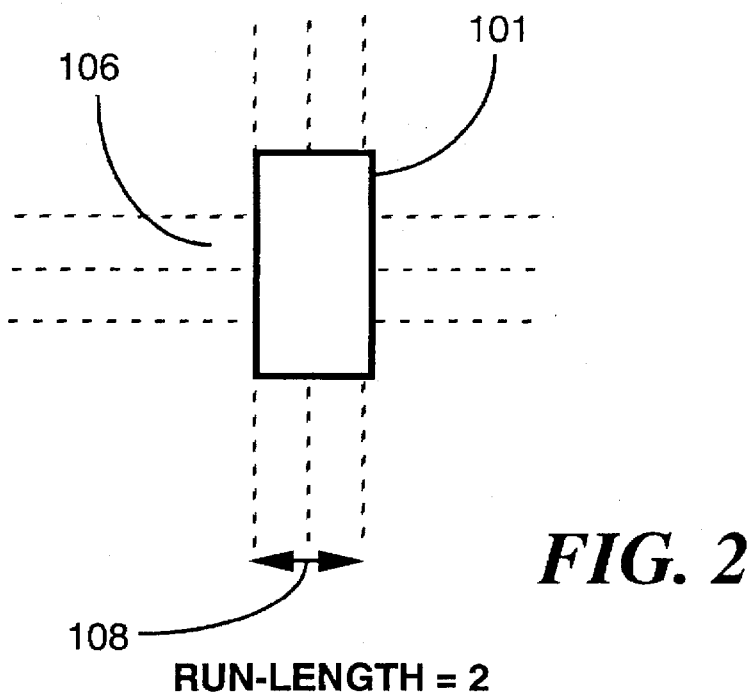
Figure 4:
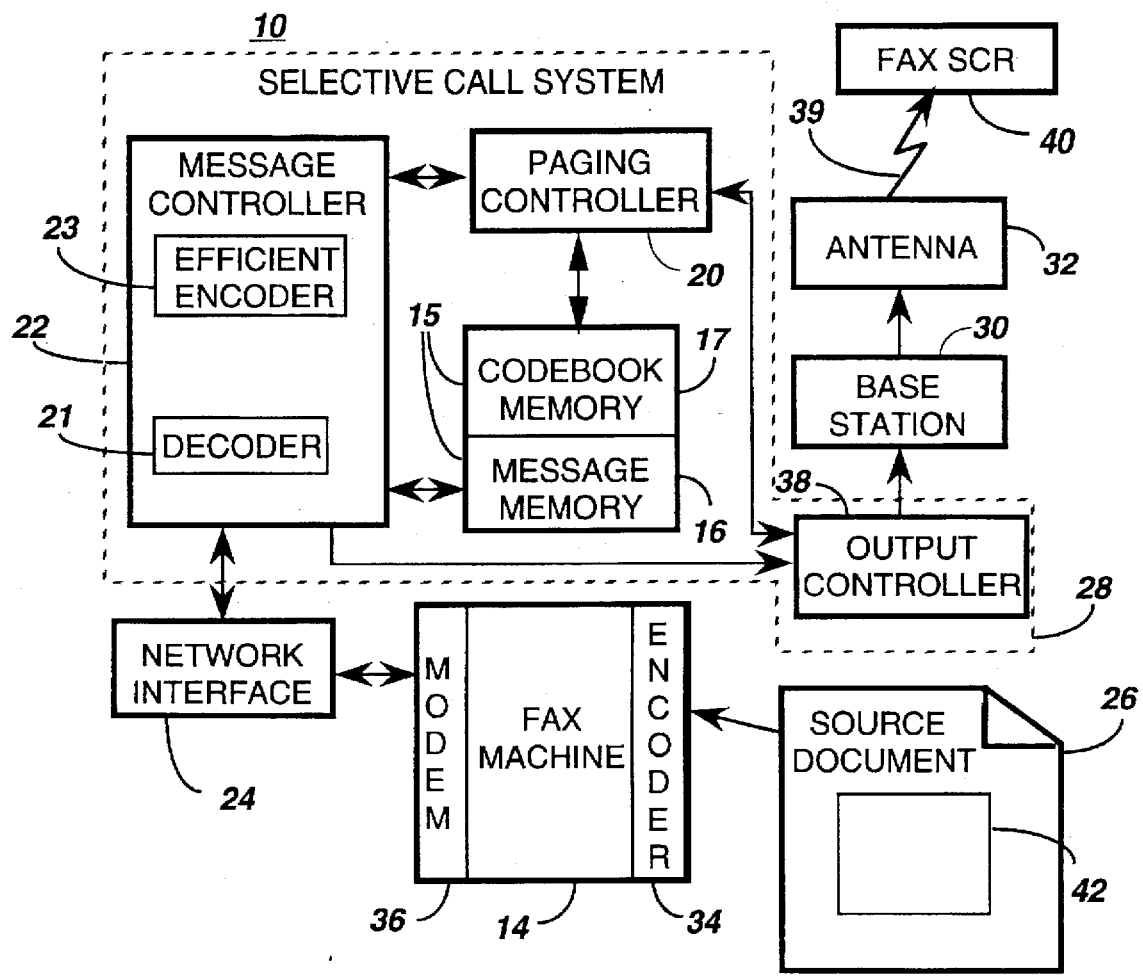
FIG. 4 is an electrical block diagram of a selective call system in accordance with a preferred embodiment of the present invention.
Figure 5:
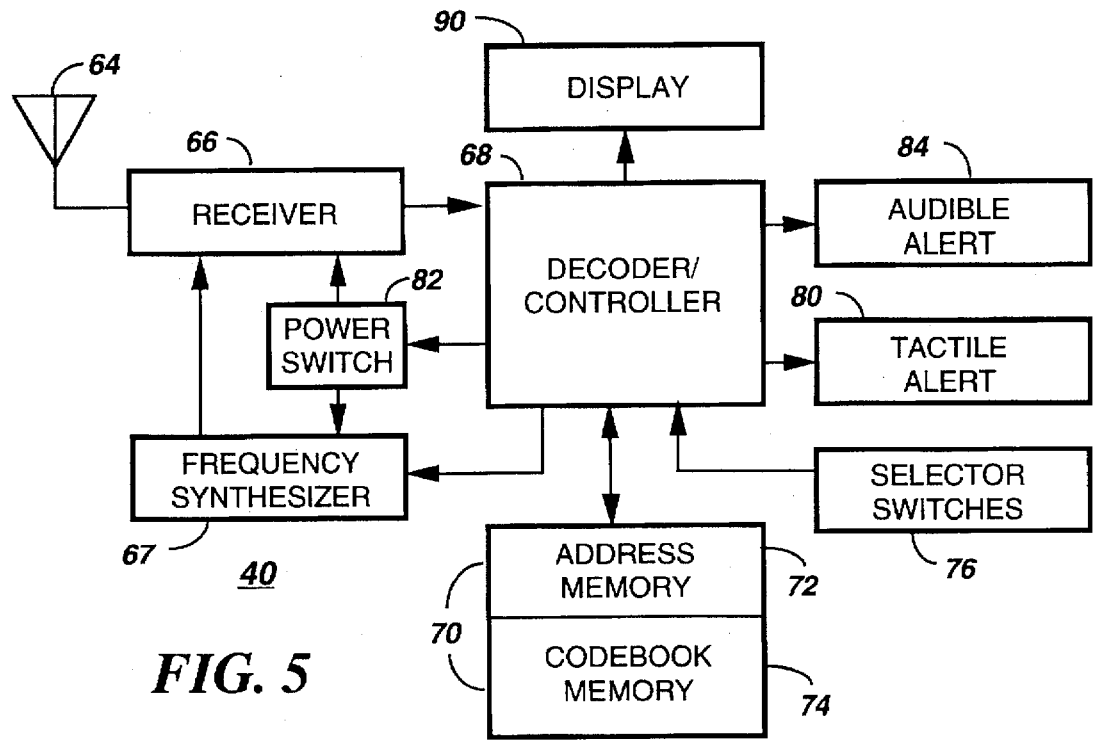
FIG. 5 is an electrical block diagram of a selective call receiver in accordance with a preferred embodiment of the present invention.
Figure 7:
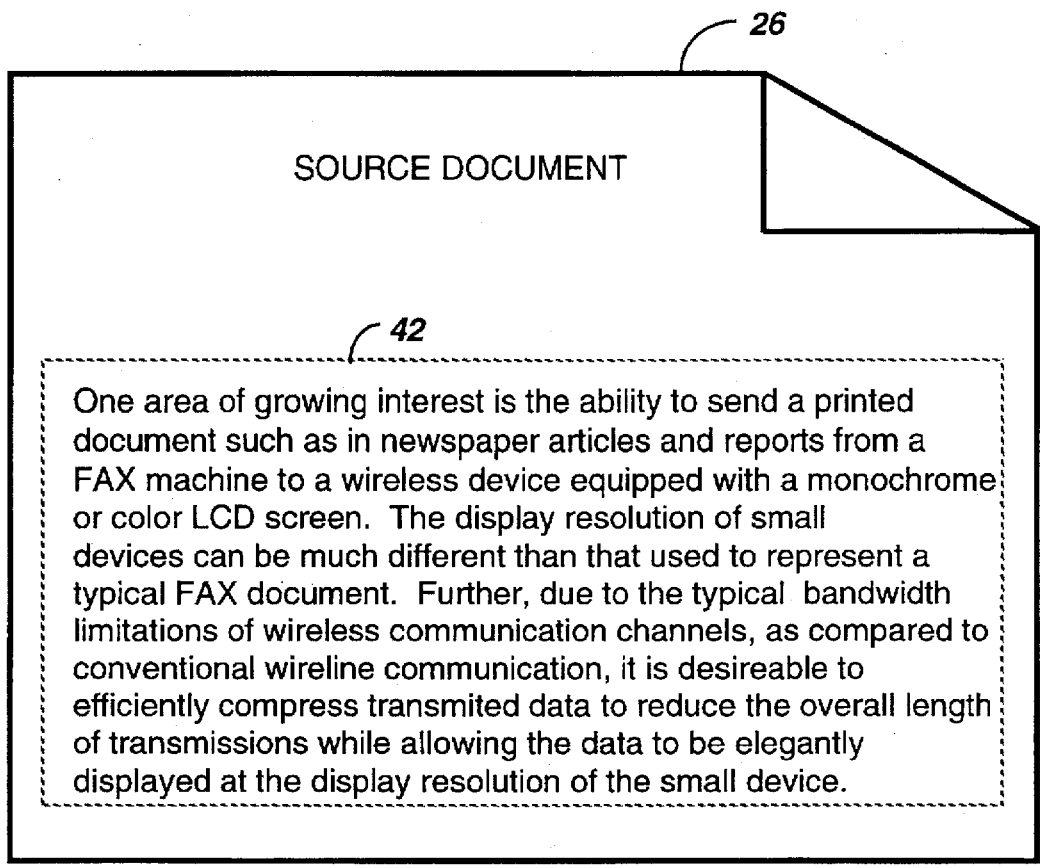
FIG. 7 illustrates an exemplary source document.

Referring to FIG. 4, an electrical block diagram of a selective call communication system 10 is shown in accordance with the preferred embodiment of the present invention. The selective call system 10 comprises at least one FAX selective call receiver 40, as illustrated in FIG. 5. Operationally, a user enters a source document 26 into a facsimile (FAX) machine (scanner) 14. As shown in FIG. 7, an exemplary source document 26 contains a message as a visible image on the source document 26 at an information region 42. The FAX machine 14 retrieves (or scans) and quantizes the visible image information (message or information) contained on the source document 26 resulting in a FAX message data. Preferably, the visible image information is contained in a predefined information region 42 of the source document 26. As is well known to one of ordinary skill in the art, the FAX machine comprises an encoder 34 and a modem 36 for encoding and compressing the FAX message data to yield a FAX message, and for transmitting the FAX message from the FAX machine 14.

The FAX machine 14 is coupled to a message controller 22 of a selective call system 10 via a network interface 24. The network interface 24, well known to one of ordinary skill in the art, can include a Public Switch Telephone Network (PSTN) or an Integrated Service Digital Network (ISDN). It can also be appreciated by one of ordinary skill in the art that the FAX machine 14 can be directly connected to the message controller 22 via a high speed network (e.g., RS-232, IEEE 802.3) to achieve an extremely high speed message throughput. Therefore, the FAX machine 14 needs not be located at the same physical site as a selective call terminal 28. Actually, the FAX machine 14 can be replaced by, for example, a computer, a conventional document scanner, or possibly a dedicated message entry device, each capable of communicating with the message controller 22 via the network interface 24.

To send a FAX to a subscriber (a person or device having a FAX selective call receiver 40), the sender, for example, enters the subscriber's identification number and other system information, and a message in the information region 42 on the source document 26. The subscriber's identification number is a unique number assigned by the paging service provider that corresponds to an address of the FAX selective call receiver 40. The subscriber's identification number is translated by the system 10 to identify an address for the FAX selective call receiver 40. The sender can, therefore, send a FAX by calling a subscriber's paging service provider using a conventional telephone to enter, for example, the subscriber's identification number and other system information. The paging service provider maintains a list of FAX capable subscriber identification numbers (and corresponding pager addresses) and upon receiving the entered subscriber identification number, a procedure to receive a facsimile message is initiated, the details will be discussed below.

The user, according to the preferred embodiment of the present invention, enters the subscriber identification for the FAX selective call receiver 40 to which the FAX is intended and other system information along with, preferably, a written text message, data, or information. Although it is preferred to have a text message, the sender can include a drawing, graphics, or other pictorial information on the source document 26. The source document 26 is then scanned into the FAX machine 14. The processing of the information is encoded and compressed by the encoder 34 of the FAX machine 14 and transferred by the modem 36 via the network interface 24 to the selective call system 10 which will produce a selective call FAX message that will be transmitted to the targeted subscriber. The preferred method, protocol, and apparatus utilized for the transmission of the selective call FAX message will be discussed in detail below.

After the document has been entered into the FAX machine 14, the entire source document 26 including information contained in the information region 42 is scanned and quantized (retrieved). Thereafter, the information is encoded and compressed by the encoder 34 in the FAX machine 14, preferably according to the Group III FAX coding scheme which is well known to one of ordinary skill in the art. Once the information is Group III encoded and compressed, it is transferred by the modem 36 to the message controller 22 via the network interface 24, e.g., the PSTN.

Group III facsimile (FAX) communication is defined under the CCITT (Consultative Committee on International Telegraph and Telephone). The Group III Facsimile Standards for encoding and compressing data are performed using the coding scheme known as the modified Huffman code. The modified Huffman code uses the standard Huffman code in conjunction with the modified READ (Relative Element Addressing Designate) code.

This conventional encoding method typically utilizes a single code book for encoding and compressing fax information. The white or black run-lengths are respectively coded according to the entries in the single code book, which, as discussed before, is normally optimized for a probability distribution for run-lengths occurring at a preferred resolution. Information at other resolutions will probably be encoded and compressed less efficiently than at the preferred resolution. Communications across the network interface 24, such as across a PSTN, have tolerated these inefficiencies in the past. However, efficient transmissions are much more important for delivery of messages across a wireless communication channel 39, such as between the selective call system 10 and the FAX selective call receiver 40.

The selective call system 10 comprises the message controller 22, the paging controller 20, and memory 15. These elements of the selective call system 10 are coupled to each other, as shown. Further, the paging controller 20 and the message controller 22 are coupled to an output controller 38. The output controller 38 is coupled to at least one base station 30. Each of the at least one base station is coupled to an antenna 32. The system 10 typically transmits selective call messages across the wireless communication channel 39 for reception by at least one FAX selective call receiver 40.

In a preferred embodiment, a decoder 21 in the message controller 22 decodes and expands the information received from the FAX machine 14. In this example, the decoder 21 operates to decode and expand the information according to the Group III FAX coding scheme. Then, an efficient encoder 23 operates to efficiently encode and compress the information, that is the FAX message data, to provide an Efficiently Encoded and Compressed (EEC) FAX message according to a preferred method of operation which will be discussed below.

In a preferred method of operation, the efficient encoder 23 utilizes a codebook memory 17. The codebook memory 17 comprises a run-length codebook, such as the exemplary codebook 200 illustrated in FIG. 3. This codebook 200 would be optimized for run-lengths occurring according to a probability distribution of a preferred resolution.

A number of terms that will be used in our discussion are defined below for clarity. The preferred resolution will be referred to as Resolution One. Further, the resolution of an image element, such as from a scanned FAX document, for clarity will be referred to as Resolution Two.

The term K will define the relationship between Resolution One and Resolution Two. K equals the nearest integer value to the resulting fraction of the Resolution Two being divided by the Resolution One. For example, if Resolution One equals 50 dots per inch (DPI) and Resolution Two equals 100 DPI, then K equals two. As a second example, if Resolution One equals 50 DPI and Resolution Two equals 140 DPI, then K equals three.

In a method for selecting a run-length code from the codebook 200, the efficient encoder 23 will utilize the value K to select the run-length code corresponding to the integer run-length value entry in the codebook 200 that results from integer dividing a scanned run-length value, such as from an image element, by the value K. After the integer division, additionally an integer remainder value will result.

As a first example, a detected run-length value for encoding is 67. In this example, a codeword for a run-length of 33 in the codebook 200 is represented by a value 10011. Additionally, Resolution One is 50 DPI and Resolution Two is 100 DPI. Therefore, K equals two. Now, to code the detected run-length having a value of 67 that is found in an image element at a resolution of 100 DPI, where the preferred resolution for the codebook 200 is 50 DPI, the efficient encoder 23 will perform the following procedure. First of all, we recognize that sixty seven equals two times thirty three plus a remainder of one. In this example, the efficient encoder 23 performs an integer division of sixty seven by the value K, where K equals 2. Sixty seven divided by two will result in a value of thirty three with a remainder of one. Therefore, the efficient encoder 23 will select the run-length code value 10011 from the codebook 200, which corresponds to the entry in the codebook 200 for a run-length value of 33.

Furthermore, in this preferred embodiment, the efficient encoder 23 utilizes at least a first remainder codebook 140 (see FIG. 11), which is stored in the codebook memory 17. This first remainder codebook 140, and three other exemplary remainder codebooks shown, represent remainder codes for possible remainder values according to a preferred efficient encoding method for the efficient encoder 23, as will be discussed below. Each of the remainder codebooks 140, 142, 144, and 146, is associated with a K value representing a relationship between the preferred resolution for the codebook 200 and a resolution of a received scanned FAX document, such as received from the FAX machine 14 and decoded by the decoder 21.

In the first remainder codebook 140 there are two possible remainder values, e.g., 0 and 1, and they are mapped to two remainder codes, e.g., 0 and 1, respectively. These two remainder codes can be encoded by using a single binary bit. This first remainder codebook 140 corresponds to information being encoded from an original resolution that is twice the resolution of the preferred resolution corresponding to the codebook 200. This relationship is noted by the expression K equals 2.

A second remainder codebook 142 represents three possible remainder values, e.g., 0, 1, and 2, which are mapped to three remainder codes, e.g., 00, 01, and 10, respectively. Notice that two binary bits can represent all the possible codes for this remainder codebook 142. This second remainder codebook 140 corresponds to information being encoded from an original resolution that is three times the resolution of the preferred resolution corresponding to the codebook 200. This relationship is noted by the expression K equals 3.

In similar fashion, a third remainder codebook 144 represents four remainders for information being encoded from an original resolution that is four times the resolution of the preferred resolution corresponding to the codebook 200. This relationship is noted by the expression K equals 4.

Lastly, in this example, a fourth remainder codebook 146 corresponds to all the remainders for information being encoded from an original resolution that is five times the resolution of the preferred resolution corresponding to the codebook 200. Notice that three binary bits can represent all the possible codes for this remainder codebook 142. This relationship is noted by the expression K equals 5.

The above exemplary remainder codebooks are preferably pre-stored in the codebook memory 17, such as at a time of system configuration. Each of the possible remainder codebooks to configure in the codebook memory 17 would represent a selectable resolution of information that is to be encoded by an efficient encoding method of the preferred embodiment. One contributor to the efficiency of the preferred encoding method is the ability for the efficient encoder 23 to encode the remainder with as few bits of information as possible. Hence, the selection of the number of bits to represent the remainder codes corresponding to the possible remainders will affect the efficiency of the compression.

Continuing with the first example, since K equals 2, the efficient encoder 23 will utilize the first remainder codebook 140 to encode the remainder. In this case, the remainder of 1 is encoded to a binary value 1. This remainder code is then concatenated with the selected run-length code value 10011. Preferably, the remainder code precedes the selected run-length code in the concatenated code word string, resulting in a code word 110011 representing the detected run-length value of 67.

As a second example, a detected run-length value for encoding is 101. In this example, a codeword for a run-length of 33 in the codebook 200 is represented by a binary value 10011. Additionally, Resolution One is 50 DPI and Resolution Two is 140 DPI. Therefore, K equals three. Now, to code the detected run-length 101 found in an image element at a resolution of 140 DPI, where the preferred resolution for the codebook 200 is 50 DPI, the efficient encoder 23 will perform the following procedure. First of all, we recognize that one hundred and one equals three times thirty three plus a remainder of two. In this example, the efficient encoder 23 performs an integer division of one hundred and one by the value K, where K equals 3. One hundred and one divided by three will result in a value of thirty three with a remainder of two. Therefore, the efficient encoder 23 will select the run-length code value 10011 from the codebook 200, which corresponds to the entry in the codebook 200 for a run-length value of 33.

Since K equals 3, the efficient encoder 23 will utilize the second remainder codebook 142 to encode the remainder. In this case, the remainder of 2 is encoded to the binary value 10. This remainder code is then concatenated with the selected run-length code value 10011. Preferably, the remainder code precedes the selected run-length code in the concatenated code word string, resulting in a code word 1010011 representing the detected run-length value of 101.

Therefore, as illustrated by the two examples above, the efficient encoder 23 utilizes the run-length codebook 200 and one of the remainder codebooks 140, 142, 144, and 146, to efficiently encode and compress all the run-length values representing the image elements from the FAX message data received from the FAX machine 14, such as from a scanned source document 26. Each efficiently encoded and compressed (EEC) run-length value corresponds to an EEC run-length code for an EEC FAX message.

The message controller 22 then directs the output of the efficient encoder 23, e.g., the EEC FAX message, to a paging controller 20 for providing additional processing of the EEC FAX message suitable for selective call communication. After storing at least a portion of the EEC FAX message in a message memory 16, the paging controller 20 couples a paging address information to the EEC FAX message resulting in a selective call FAX message stored in the message memory 16. The paging controller 20 then selects the selective call FAX message from the message memory 16 and processes the selective call FAX message for transmitting the selective call FAX message to at least one subscriber having a FAX selective call receiver 40. After processing the selective call FAX message, the paging controller 20 then couples the selective call FAX message to an output controller 38 which then couples the selective call FAX message to a transmitter which comprises a base station 30 and an antenna 32. The base station 30 broadcasts via the antenna 32 a signal modulated with FAX information representing the selective call FAX message. See for example FIGS. 12, 13, and 14, which will be discussed below.

Figure 8:
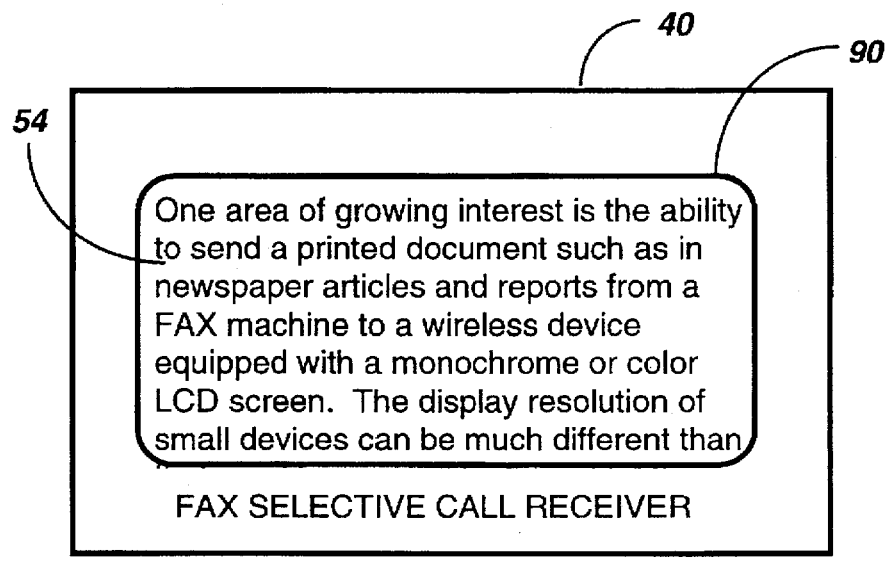
FIG. 8 is a plan view of an exemplary selective call receiver displaying information on a display in accordance with the present invention.

A FAX selective call receiver 40 is then able to detect its address, recover the information, alert the user, and make the received information available for presentation to the user in a variety of formats including, but not limited to, ASCII text, characters, graphics, and audio. Some specialized applications that can be accommodated by the preferred embodiment of the selective call communication system 10 are electronic mail, storage, retrieval, and forwarding of facsimile messages, and integration of text with graphics into a compound document architecture compatible with industry standard computer productivity software applications. As an example, FIG. 8 illustrates message information 54, such as originating from the source document 26 shown in FIG. 7, being displayed on a display 90 of the FAX selective call receiver 40. Although the message information 54 shown in FIGS. 6 and 7 comprises English characters, it can be appreciated by one of ordinary skill in the art that any other graphical image representation, characters, ideographic characters, icons, and other similar data can be equally applicable.

Referring to FIG. 5, an electrical block diagram of the FAX selective call receiver 40 is shown in accordance with the preferred embodiment of the present invention. The FAX selective call receiver 40 comprises an antenna 64 for intercepting transmitted radio frequency (RF) signals which is coupled to the input of a receiver 66. The receiver 66 provides for reception of transmissions on a single reception frequency, or, as will be further described below, reception on multiple reception frequencies. When multiple frequency reception is provided, a frequency synthesizer 67 enables the generation of the multiple reception frequencies in a manner well known to one of ordinary skill in the art. The receiver 66 receives and demodulates the transmitted signals, preferably frequency modulated data signals, providing at the output of the receiver 66 a stream of binary data signals. The binary data signals are coupled into the input of a decoder/controller 68 which processes the binary data signals, in a manner well known in the art.

A received address signal is compared with at least one predetermined address stored in a table in an address memory 72. The address memory 72 and a codebook memory 74 constitute a memory 70 that is coupled to the decoder/controller 68. The memory 70 preferably is a non-volatile memory, such as a battery backed-up random access memory or other non-volatile read-write capable memory. Selector switches 76, or other buttons, or touch pads, or similar input devices, are coupled to the decoder/controller 68 to enable a user to provide user input, such as to select functions of the FAX selective call receiver 40. A display 90 is used to display information to the user. For example, the display 90 may display at least a portion of a FAX message received by the FAX selective call receiver 40. See also FIG. 8.

After the FAX selective call receiver 40 receives a selective call FAX message via the wireless communication channel 39 (see FIG. 4), the decoder/controller 68 compares the received paging address information with the at least one predetermined address stored in the address memory 72, and when a match is detected, the decoder/controller 68 generates an alert enable signal which is coupled to the input of a sensible alerting device, such as an audible alerting device 84 or a tactile alerting device 80. The tactile alerting device 80 preferably provides a silent vibratory output for alerting the subscriber. The subscriber can select a desired mode of alert, e.g., audible or silent alerting, by entering user input via the selector switches 76.

After a match is detected between the received paging address information and one of the at least one predetermined address stored in the address memory 72, the decoder/controller 68 preferably stores the received encoded and compressed FAX message in the memory 70. Subsequently, the decoder/controller 68 utilizes information stored in the codebook memory 74 to efficiently decode and expand the FAX message to provide FAX message data, according to a method that will be discussed below, and then stores the resulting decoded and expanded FAX message in the memory 70 for presentation, such as by the display 90, to a user of the FAX selective call receiver 40. Alternatively, the decoder/controller 68 can utilize the codebook memory 74 to efficiently decode the EEC FAX message as it is being received from the output of the receiver 66. The decoder/controller 68 then can store the resulting FAX message data in the memory 70 for presentation to the user of the FAX selective call receiver 40.

A power switch 82 coupled to the decoder/controller 68 is used to control the supply of power to the receiver 66, and preferably also to the frequency synthesizer 67, thereby providing a battery saving function in a manner well known in the art for selective call receivers.

Figure 6:
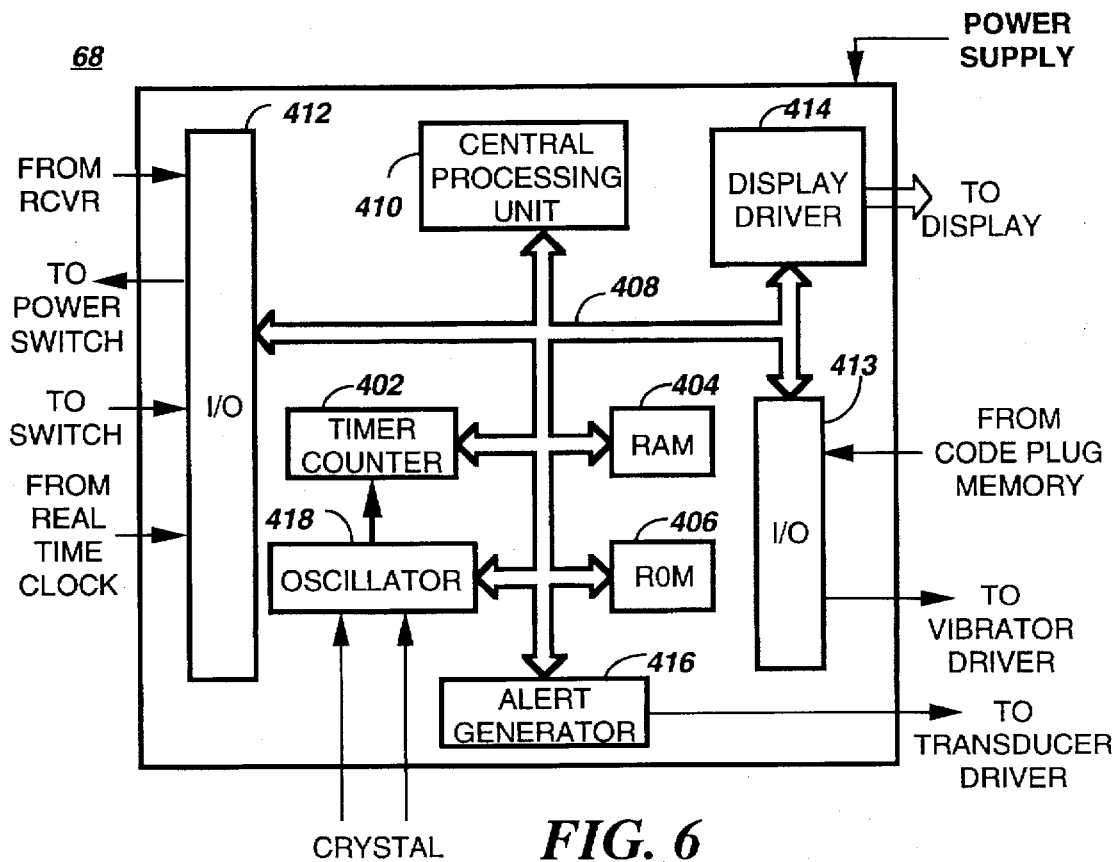
FIG. 6 is an electrical block diagram of a microcomputer based decoder/controller suitable for use in the selective call receiver of FIG. 5.

The controller/decoder 68 of FIG. 5 can be implemented utilizing a microcomputer 68 as shown in FIG. 6. The microcomputer 68 shown in FIG. 6 is preferably of the family of MC68HC05 series microcomputers, such as manufactured by Motorola, Inc., which includes on-board a display driver 414. The microcomputer 68 includes an oscillator 418 which generates the timing signals utilized in the operation of the microcomputer 68. A crystal, or crystal oscillator (not shown) is coupled to the inputs of the oscillator 418 to provide a reference signal for establishing the microcomputer timing. A timer/counter 402 couples to the oscillator 418 and provides programmable timing functions which are utilized in controlling the operation of a receiver 66 or of the central processing unit 410. A RAM (random access memory) 404 is utilized to store variables derived during processing, as well as to provide storage of FAX or paging information which are received during operation as a selective call receiver. A ROM (read only memory) 406 stores the routines which control the operation of the receiver 66 or of a central processing unit (CPU) 410 which will be discussed further below. It will be appreciated that in many microcomputer implementations, the programmable-ROM (PROM) memory area can be provided either by a programmable read only memory (PROM) or an EEPROM (electrically erasable programmable read only memory). The oscillator 418, timer/counter 402, RAM 404, and ROM 406 are coupled through an address/data/control bus 408 to the central processing unit (CPU) 410 which performs the instructions and controls the operations of the microcomputer 68.

Demodulated data generated by the receiver 66 is preferably coupled into the microcomputer 68 through an input/output (I/O) port 412. The demodulated data is processed by the CPU 410. When a received address matches that stored within a code-plug memory, such as the address memory 72 shown in FIG. 5, which preferably couples into the microcomputer 68 through an I/O port 413, a selective call FAX message is thereafter received and stored in RAM 404. Recovery of the stored message is provided by the selector switches 76 which are coupled to the I/O port 412. The microcomputer 68 then recovers the stored message and directs the information over the address/data/control bus 408 to the display driver 414 which processes the information and formats the information for presentation by the display 90 (see FIG. 5), such as an LCD (liquid crystal display).

When the FAX selective call receiver 40 receives its address, the CPU 410 generates an alert signal that is routed through the address/data/control bus 408 to an alert generator 416. The alert generator 416 then generates an alert enable signal that is coupled to the audible alerting device 84 (see FIG. 5). Alternatively, when a vibrator alert is selected by a user of the FAX selective call receiver 40, as described above, the CPU 410 generates an alert enable signal which is coupled through address/data/control bus 408 to the I/O port 413 and thereby to the tactile alerting device 80 (see FIG. 5) to enable generation of a vibratory, or silent alert.

The battery saver operation is controlled by the CPU 410. Battery saving signals are directed over the address/data/control bus 408 to the I/O port 412 which couples to the power switch 82 (see FIG. 5). Power is periodically supplied to the receiver 66 to enable decoding of received selective call receiver address signals and of selective call FAX message information which is directed to the FAX selective call receiver 40. The CPU 410 stores the selective call FAX message information in a memory, such as the RAM 404 or the memory 70 (see FIG. 5), to be presented to a user of the FAX selective call receiver 40, such as to be displayed on the display 90.

Figures 12, 13, 14:
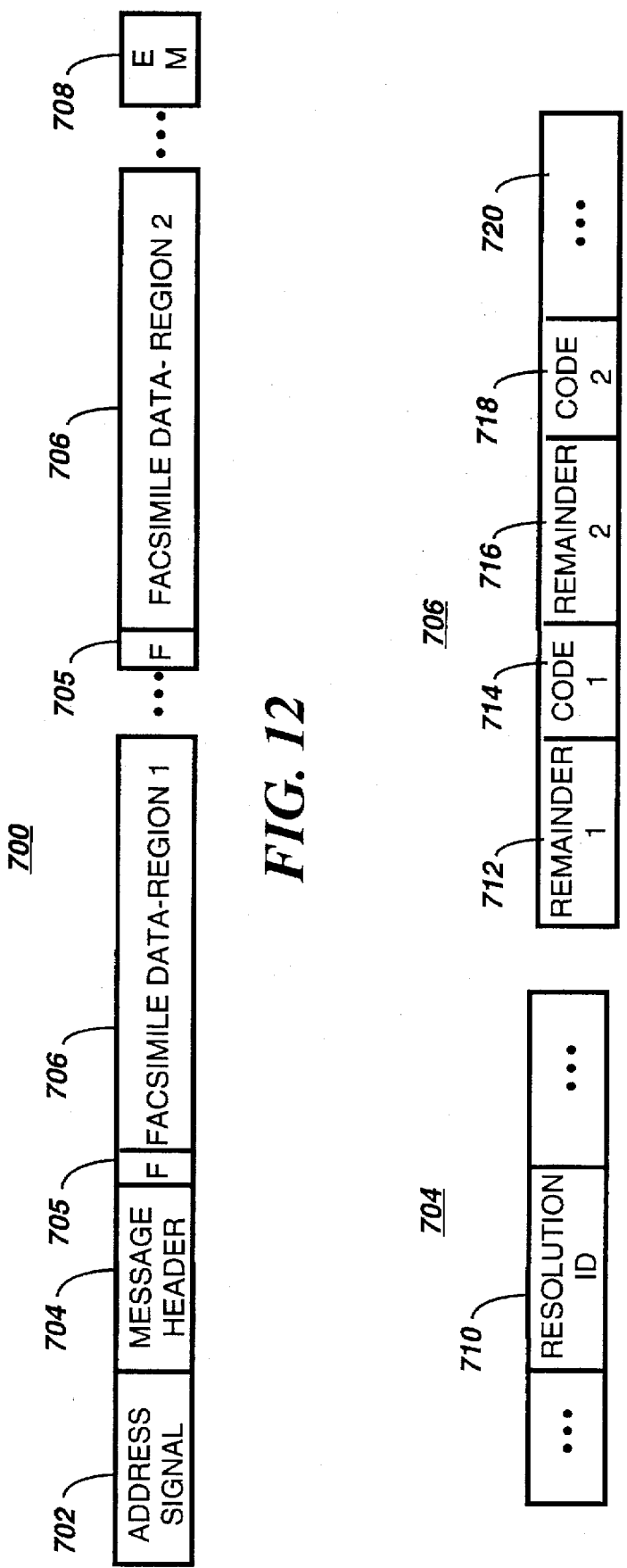
FIGS. 12, 13, and 14 are timing block diagrams illustrating a preferred selective call information signaling format in accordance with the preferred embodiment of the present invention.

Referring again to FIG. 5, the decoder/controller 68 utilizes the codebook memory 74 to efficiently decode the received encoded and compressed FAX message according to a preferred method discussed below. Firstly, as illustrated in FIGS. 12, 13, and 14, the selective call system 10 utilizes a preferred selective call information signaling format for delivering a selective call FAX message 700 (see FIG. 12). The selective call FAX message 700 comprises an address signal 702 and an EEC FAX message 706 that may be organized in one or more message data blocks delimited by a format identifier/block start marker 705 and terminated by an end of message data marker 708. The EEC FAX message 706, as illustrated in FIG. 14, comprises a sequence of efficiently encoded and compressed pairs representing a facsimile message, such as a first remainder code 712 coupled with a first run-length code 714 followed by a second remainder code 716 coupled with a second run-length code 718 and then followed by more code pairs 720 as needed to represent the EEC FAX message 706. Additionally, the selective call FAX message 700 comprises a message header 704 (see FIG. 13) that includes a resolution ID 710. The resolution ID 710 identifies a resolution of the transmitted FAX message 700, such as the resolution of a resulting FAX message from the FAX machine 14 (see FIGS. 4 and 7) scanning a visible image contained on a source document 26. The message header 704 may also contain information on a block length, a FAX protocol type, a data flag to determine if a FAX or a regular paging message is being received, and an encryption type for use in a secure FAX messaging system. This embodiment can be used in conjunction with a conventional FAX machine to receive FAX messages via a wireless data channel. Furthermore, when used in conjunction with a personal computer or the like (e.g., a laptop computer), the FAX selective call receiver 40 as illustrated in FIG. 5 can couple the received FAX message data to the computer for storage in a file, thus allowing the user to have an archive of the received FAX messages. Since the received FAX message data is unaltered from its native transmission format, conventional facsimile data manipulation hardware and software can be used to obtain a hardcopy of the received FAX.

After the decoder/controller 68 recovers the resolution ID 710 from the selective call FAX message 700, the decoder/controller 68 generates a value K therewith. The value K represents the nearest integer value to the resulting fraction of two resolutions. The numerator of the fraction is the resolution identified by the Resolution ID 710. The denominator of the fraction is the preferred resolution for a run-length codebook that is stored in the code-book memory 74. The code-book memory 74 comprises a run-length codebook that may be similar to the exemplary codebook 200 illustrated in FIG. 3. This run-length codebook in the code-book memory 74 would be optimized for run-lengths occurring according to a probability distribution of the preferred resolution.

With the value K, the decoder/controller 68 then decodes and expands the EEC FAX message 706 by sequentially retrieving a remainder code 712 and a run-length code 714 from the EEC FAX message 706 and therewith generating a run-length value as discussed below. Each subsequent pair of remainder code 716 and run-length code 718 are decoded to generate a subsequent run-length value. The sequence of decoded and expanded run-length values constitutes a representation of the FAX message, such as the FAX message from the FAX machine 14 (see FIGS. 4 and 7) scanned from a visible image contained on a source document 26.

The decoder/controller 68 first decodes a remainder value from a remainder codebook. Specifically, the decoder/controller 68 retrieves a remainder code 712 and performs a look-up in a remainder codebook to find a remainder value associated with the remainder code 712 in the codebook. The remainder codebook utilized for the decoding and expansion process is preferably one of at least one remainder codebook stored in the code-book memory 74. See for example FIG. 11. The particular remainder codebook utilized for the decoding and expansion process is selected based on the value K.

The decoder/controller 68 then decodes and expands a run-length value by adding the decoded remainder value to a value computed by multiplying K times a decoded run-length value that is decoded as follows. First, the decoder/controller 68 retrieves a run-length code 714 from the EEC FAX message 706. Then, the decoder/controller 68 performs a look-up with the run-length code 714 into a run-length codebook to find a run-length value that is associated with the run-length code 714. Preferably, the run-length codebook is stored in the code-book memory 74. Lastly, the looked-up run-length value from the run-length codebook is multiplied by the value K. The resulting value is then added to the remainder value looked-up from the remainder codebook. The decoding relationship can be expressed as follows:

The Decoded and Expanded Run-length Value= Remainder

Value Decoded From Remainder Codebook+K * Run-length

Value Decoded From Run-Length Codebook.

The decoding and expanding process is repeatedly applied to a first pair of codes consisting of the first remainder code 712 and the first run-length code 714, then followed by subsequent pairs of codes, such as the second remainder code 716 and the second run-length code 718, and so on. The resulting sequence of decoded and expanded run-length values represents the decoded and expanded FAX message, such as the FAX message from the FAX machine 14. The process discussed above, therefore, will efficiently decode and expand the received EEC FAX message 706 at the FAX selective call receiver 40.

Figure 9:
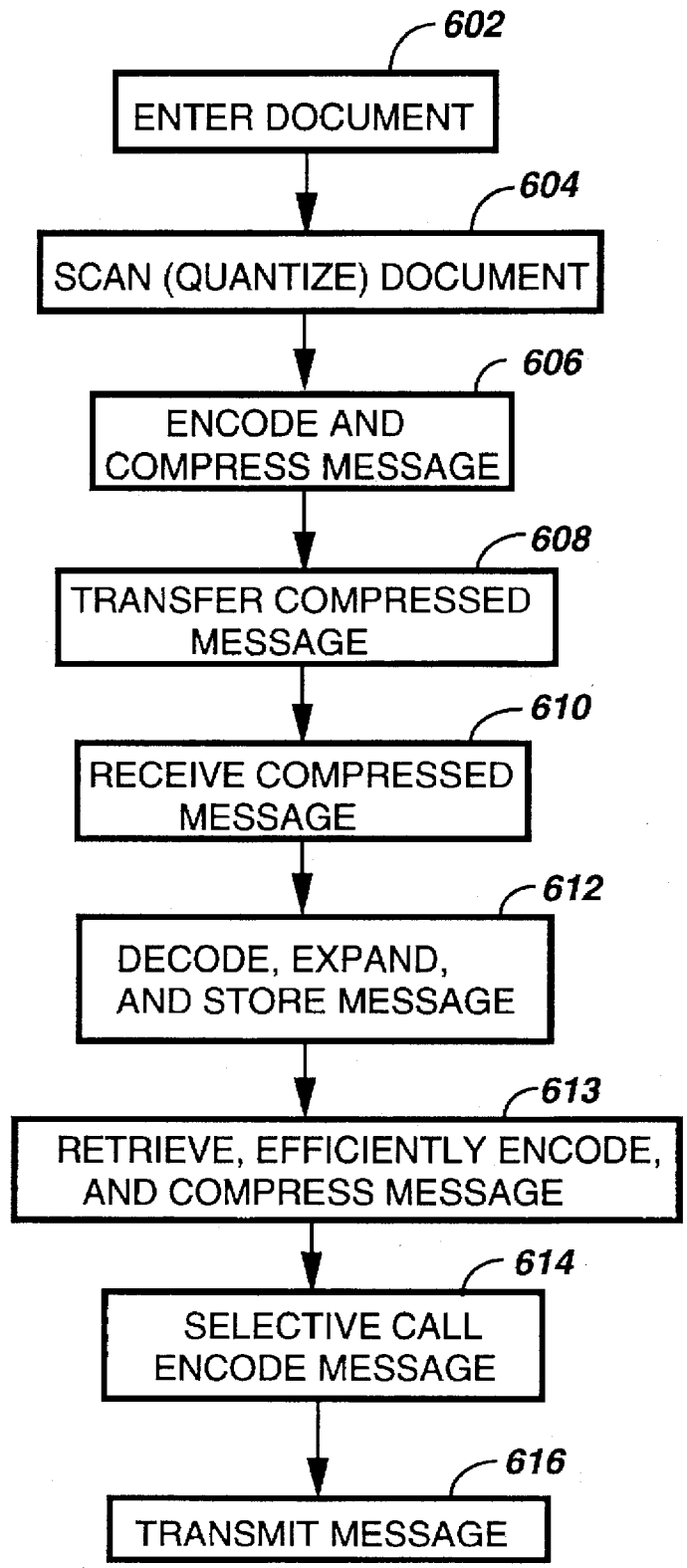
FIG. 9 is a flow diagram illustrating a first operation of the selective call system of FIG. 4 in accordance with a preferred embodiment of the present invention.

Method steps illustrating operations of the preferred embodiment of the present invention will be discussed below. Referring first to FIG. 9 and to FIG. 4, a flow diagram is shown illustrating facsimile communication for the selective call system 10 in accordance with the preferred embodiment of the present invention. When the source document 26 has been entered, at step 602, the FAX machine 14 scans and quantizes the information on the source document 26, at step 604. The quantized information is then encoded and compressed, preferably according to the Group III facsimile standard, at step 606. The encoded and compressed information is transferred from the FAX machine 14 to the message controller 22 via the network interface 24 such as the PSTN, at step 608. The message controller 22 receives the compressed information and stores it in memory to be accessed by the processor 20 which processes the compressed information before transmission to its designated FAX selective call receiver 40, at step 610. The received information is then decoded from the Group 3 format to retrieve the information, at step 612. Then, the information is efficiently encoded and compressed, at step 613, utilizing a run-length codebook and one of at least one remainder codebook stored in a codebook memory 17. The efficient encoding and compression method will be more fully discussed below with reference to FIG. 10. Continuing the method with FIG. 9, the information is then processed further to selective call encode the information, at step 614. In the selective call encoding step, the information is encoded with the address of the at least one FAX selective call receiver 40 for which the information is intended. The message is then transmitted to the at least one FAX selective call receiver 40, at step 616.

Figure 10:
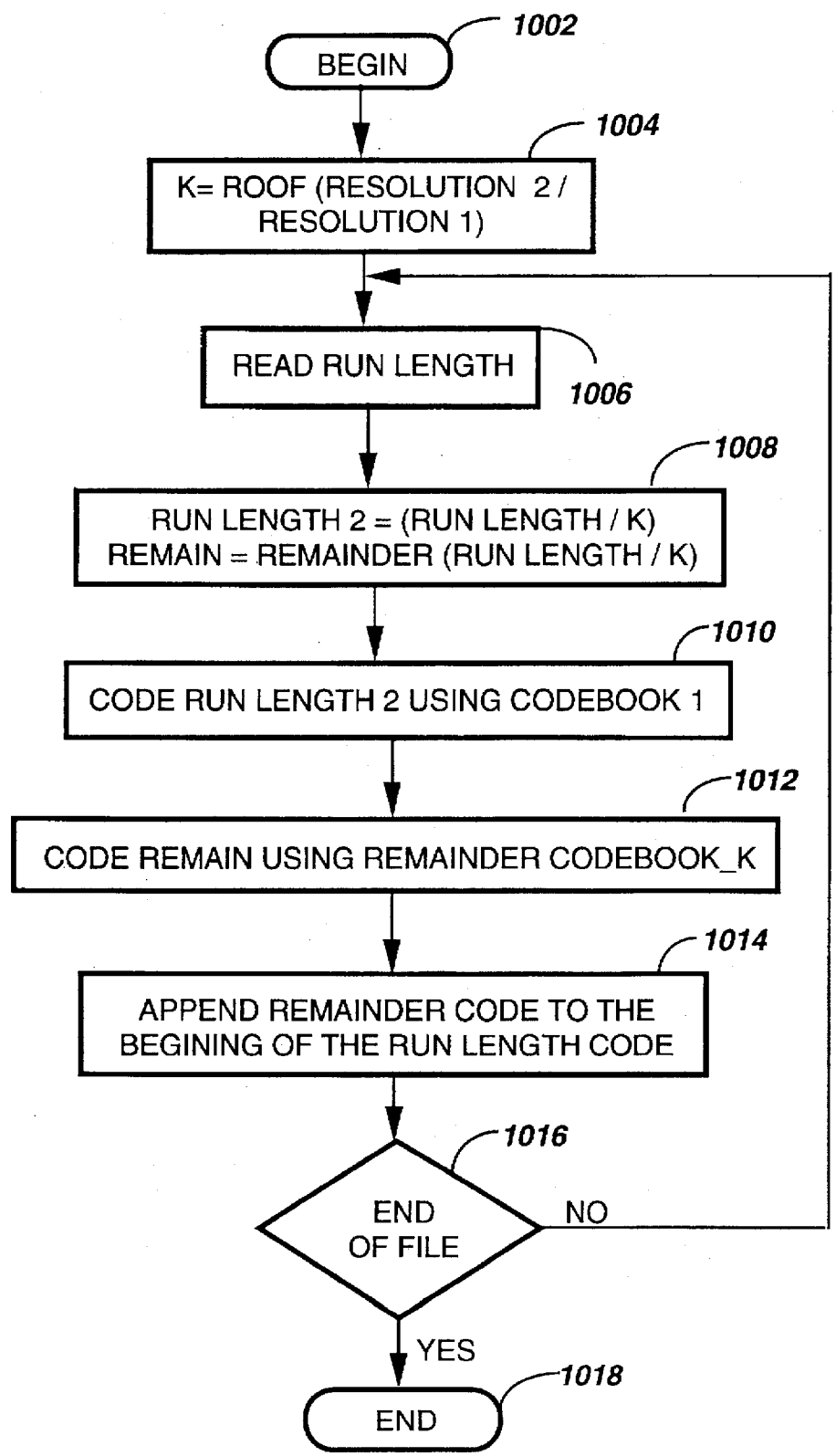
FIG. 10 is a flow diagram illustrating a second operation of the selective call system of FIG. 4 in accordance with a preferred embodiment of the present invention.

Referring now to FIG. 10, the efficient encoder 23 operates on a sequence of run-length values from a FAX message to efficiently encode and compress the information of the FAX message. After initializing and beginning an efficient encoding procedure, at step 1004, a K value for the efficient encoding process is computed, as discussed above with reference to FIG. 4. The K value equals the nearest integer value to the resulting fraction of the resolution of the FAX message being divided by the preferred resolution for which the run-length codebook 200 was optimized. Then, for each run-length value retrieved from the information of a FAX message, the efficient encoder 23 efficiently encodes and compresses the run-length value as follows. After reading the run-length value, at step 1006, the efficient encoder 23 selects a run-length code from a run-length codebook 200 and selects a remainder code from a remainder codebook 140, at step 1008. As discussed before, the run-length code is selected by looking up in the run-length codebook 200 a corresponding run-length value that results from integer dividing the run-length value of the FAX message by the value K, at step 1010. The remainder codebook is selected by the value K, as discussed before with reference to FIG. 4 and FIG. 11. The remainder code is selected, then at step 1012, by taking the remainder value from the previous integer division of the run-length value of the FAX message by the value K, and performing a look-up in the remainder codebook 140 to find a corresponding remainder code. Lastly, at step 1014, the remainder code is appended to and precedes the run-length code to concatenate the two codes as an efficiently encoded and compressed the current run-length code corresponding to a run-length value from the sequence of run-length values from the FAX message. While the end of the information of the FAX message has not been detected, at step 1016, the efficient encoder 23 continues to operate on the subsequent run-length values from the FAX message. This process continues until all run-length values of the FAX message have been efficiently encoded and compressed, and then the resulting efficiently encoded and compressed FAX message is stored in a message memory 16 and the efficient encoder 23 terminates the encoding and compressing procedure, at step 1018.

Figure 15:
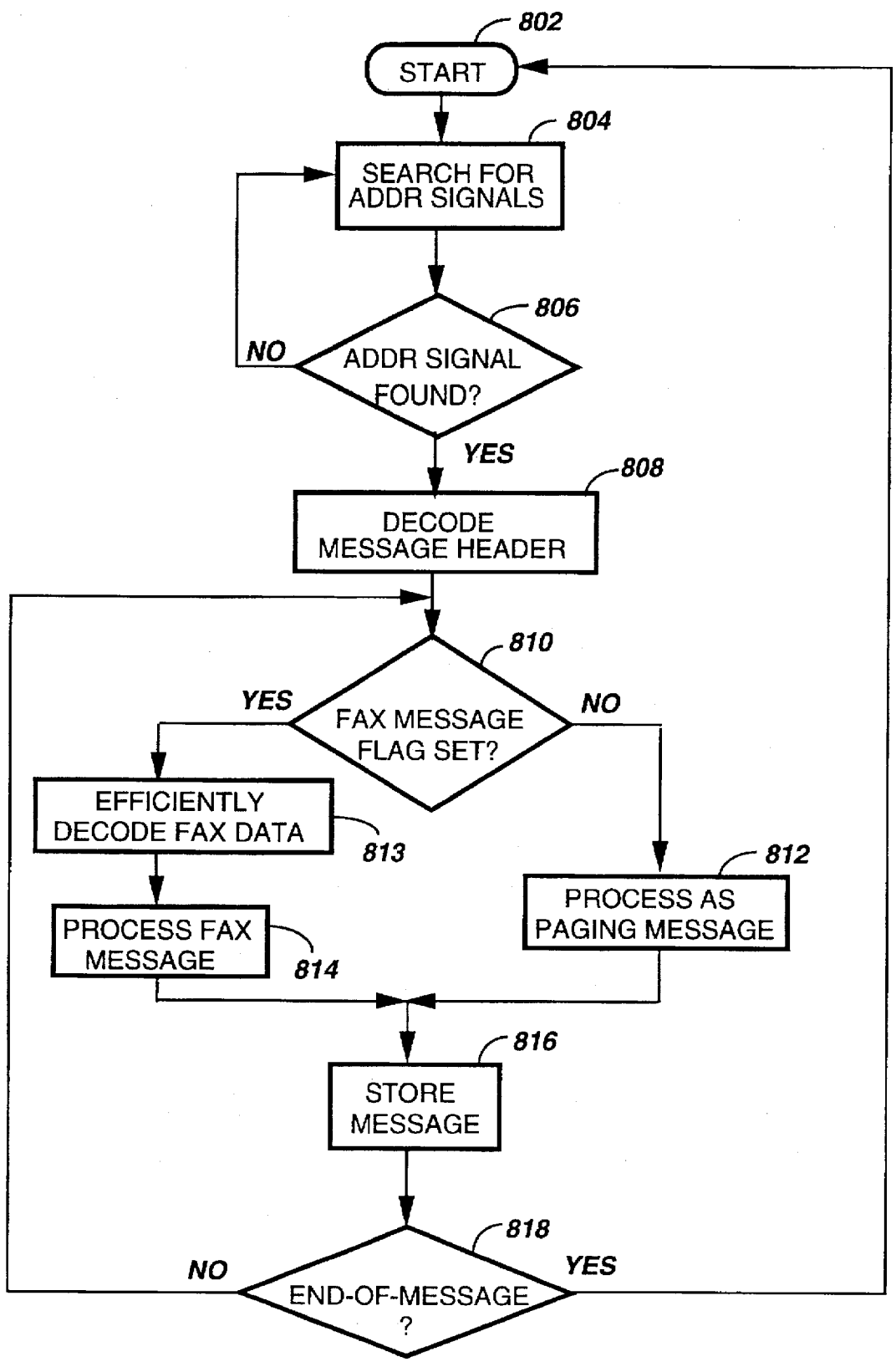
FIG. 15 is a first flow diagram illustrating a first operation of the selective call receiver of FIG. 5 according to the preferred embodiment of the present invention.

After the message is transmitted to the at least one FAX selective call receiver 40, at step 616 (FIG. 9), the at least one FAX selective call receiver 40 operates to receive and efficiently decode and expand the message as discussed below. Referring to FIG. 15, the flow diagram illustrates a receiving operation of the FAX selective call receiver of FIG. 5. The process of receiving a selective call message begins at step 802. In step 804, an address decoder, such as the decoder/controller 68 searches a received signal for an address signal. Step 806 tests any recovered address signals to determine if they correlate with at least one predetermined address associated with the FAX selective call receiver 40. If a received address signal does not correlate (match) with any one of the at least one predetermined address, control is returned to step 804 and a new search is performed. During the searching step 804, the decoder/controller 68 may periodically perform power conservation utilizing the power switch 82 as discussed above. When a received address signal correlates with at least one predetermined address associated with the FAX selective call receiver 40, at step 808, the decoder/controller 68 decodes the message header 704. At step 810, the decoder/controller 68 tests for the presence of a FAX data flag in the message header 704. If step 810 is false, the following data block will contain symbols that will be decoded as a conventional paging message, at step 812. When decoding is complete, step 816 stores the data and step 818 tests for an end of message condition which may be indicated by an end-of-message marker or the lack of another data flag. When step 818 is true, control is returned to step 802 and the address decoder resumes searching for valid addresses. If step 818 is false (not yet at end of message) the process returns to step 810 to test the data type of the following data block. In any case, if, at step 810, the decoder/controller 68 determines that the data type of a message block is FAX message data, the FAX message data of the data block is efficiently decoded and expanded, at step 813, and the efficiently decode and expanded FAX message is then further processed, at step 814, and then stored in memory 70, at step 816.

Figure 16:
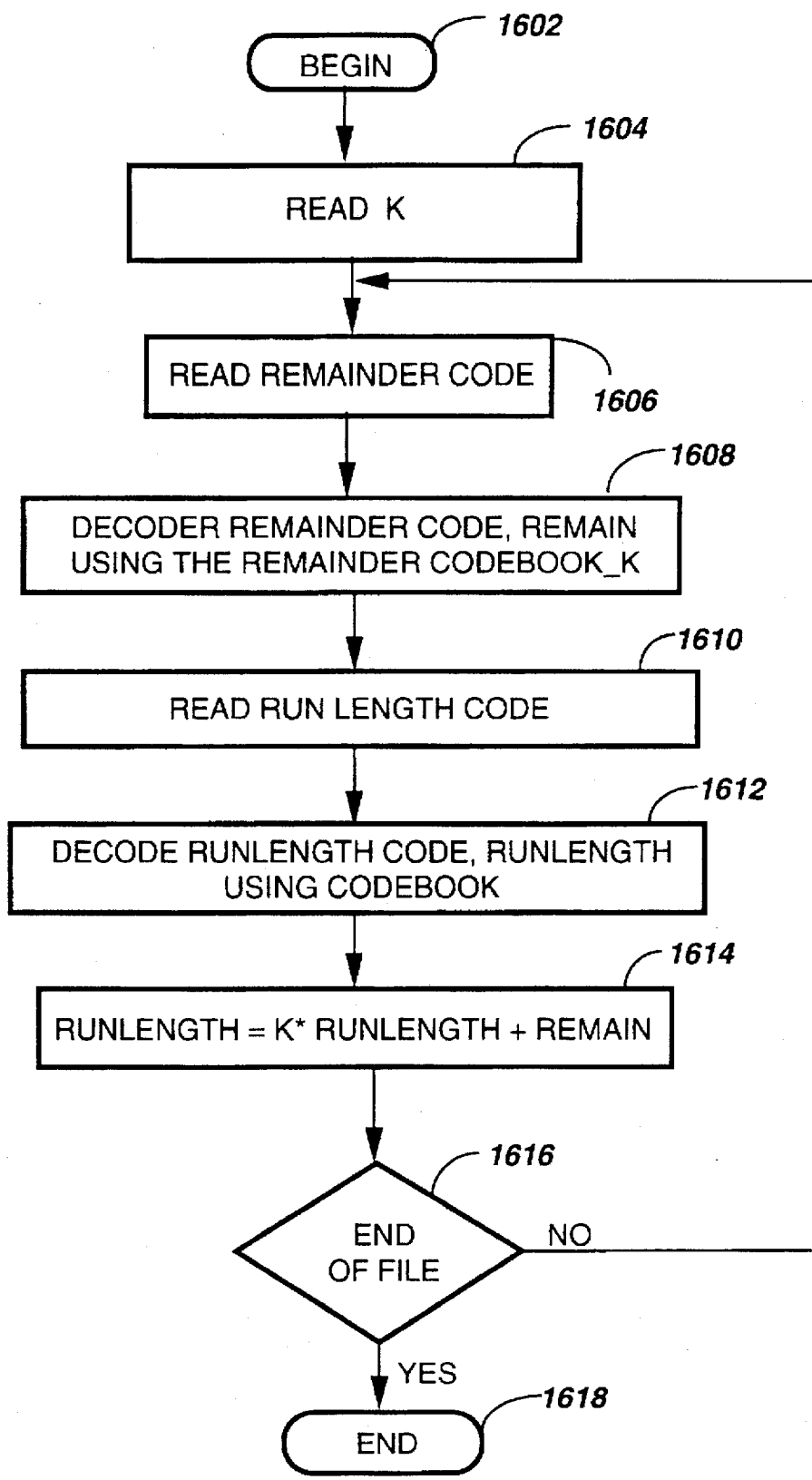
FIG. 16 is a second flow diagram illustrating a second operation of the selective call receiver of FIG. 5 in accordance with the preferred embodiment of the present invention.

After a type of the message block is determined to be FAX message data, at step 810, the decoder/controller 68 efficiently decodes and expands the FAX message data, at step 813, as discussed in more detail below. Referring to FIG. 16, the decoder/controller 68 initializes and prepares to efficiently decode and expand a FAX message at step 1602. First, the decoder/controller 68 computes the value K, at step 1604. A method of computation of the value K was discussed above with reference to FIG. 5. The value K represents the nearest integer value to the resulting fraction of two resolutions. The numerator of the fraction is the resolution identified by the Resolution ID 710 from the message header 704. The denominator of the fraction is the preferred resolution for a run-length codebook that is stored in the codebook memory 74. This run-length codebook in the codebook memory 74 would be optimized for run-lengths occurring according to a probability distribution of the preferred resolution.

Then, at step 1606, the decoder/controller 68 retrieves the next remainder code from the FAX message data. At step 1608, the decoder/controller 68 then performs a look-up with the remainder code in a remainder codebook to find a corresponding remainder value. The remainder codebook, as discussed above, is selected based on the value K. Subsequently in the process, at step 1610, the decoder/controller 68 retrieves the run-length code from the FAX message data. The decoder/controller 68 performs a look-up with the run-length code in a run-length codebook, at step 1612, to find a corresponding run-length value from the codebook. Then, at step 1614, the decoder/controller 68 generates the efficiently decoded and expanded run-length value by multiplying the value K times the looked-up run-length value, and then adding to the result the looked-up remainder value. The efficiently decoding and expanding process is repeatedly applied to remainder codes and run-length codes in the FAX message data, until the end of the FAX message data is detected, at step 1616. Then, at step 1618, the decoder/controller 68 stores the efficiently decoded and expanded FAX message in a memory 70, and then and the decoder/controller 68 terminates the decoding and expanding procedure.

In summary, the preferred selective call system 10 is capable of efficiently encoding and compressing FAX message data for transmission as a selective call FAX message, such as via a wireless communication channel. A FAX selective call receiver 40 accordingly is capable of efficiently decoding and expanding a received selective call FAX message to present the FAX message to a user of the FAX selective call receiver 40. This method of facsimile communication provides significant advantages in communication efficiency and reliable message delivery by efficiently encoding and compressing FAX message data. The shorter message length allows faster completion of a message transmission. Further, the less amount of time that a message is exposed to communication hazards, such as noise and other interference, the more likely that a reliable transmission will result. Furthermore, the shorter message lengths make re-transmission, if necessary, more feasible for a selective call system 10.

What is claimed is:

1. In a selective call system, a method of facsimile communication, comprising the steps of:
   (a) receiving a subscriber identification number and a FAX message that comprises FAX message data that has been facsimile encoded and compressed according to a facsimile coding scheme;
   (b) decoding and expanding the FAX message according to the facsimile coding scheme to retrieve the FAX message data;
   (c) efficiently encoding and compressing the FAX message data to provide an Efficiently Encoded and Compressed (EEC) FAX message, the step (c) of efficiently encoding and compressing comprising:
   (c1) Computing a K value representing an integer ratio between a resolution of the FAX message data and a preferred resolution, a run-length codebook has been optimized for run-lengths occurring according to a probability distribution of the preferred resolution;
   (c2) Integer dividing a run-length value from the FAX message data by the K value to result in an integer run-length value and a remainder value;
   (c3) Selecting a remainder code from a remainder codebook by looking-up the remainder value in a remainder codebook to find the remainder code;
   (c4) Selecting a run-length code from the run-length codebook by looking-up the integer run-length value in the run-length codebook to find the run-length code; and
   (c5) Storing the remainder code and the run-length code in a memory to represent an EEC run-length code for inclusion in the EEC FAX message;
   (d) processing the EEC FAX message and the subscriber identification number to provide a selective call FAX message destined for at least one FAX selective call receiver; and
   (e) transmitting the selective call FAX message for reception by the at least one FAX selective call receiver.

2. The method of claim 1, wherein steps (c1), (c2), (c3), (c4), and (c5) are performed for all run-length values of the FAX message data to provide the EEC FAX message.

3. The method of claim 1, wherein the remainder codebook is selected from at least one remainder codebook based on the K value.

4. In a FAX selective call receiver, a method for facsimile communication comprising the steps of:
   (a) receiving a selective call FAX message destined for the FAX selective call receiver, the selective call FAX message comprising an Efficiently Encoded and Compressed (EEC) FAX message;
   (b) efficiently decoding and expanding the EEC FAX message to provide FAX message data, the step (b) of efficiently decoding and expanding comprising:

(b1) Computing a K value representing an integer ratio between a resolution identified in the selective call FAX message and a preferred resolution, a run-length codebook in the FAX selective call receiver has been optimized for run-lengths occurring according to a probability distribution of the preferred resolution;

(b2) Selecting a remainder value from a remainder codebook by looking-up a remainder code from the EEC FAX message in a remainder codebook to find the remainder value;

(b3) Selecting a run-length value from the run-length codebook by looking-up a run-length code from the EEC FAX message in the run-length codebook to find the run-length value;

(b4) Multiplying the run-length value by the K value and adding the remainder value to the result of the multiplication to provide a decoded and expanded run-length value; and (b5) Storing the decoded and expanded run-length value in a memory for providing FAX message data, the FAX message data being presentable to a user of the FAX selective call receiver.

5. The method of claim 4, wherein the steps (b1), (b2), (b3), (b4), and (b5) are performed for all remainder codes and run-length codes, respectively, of the EEC FAX message to provide the FAX message data.

6. The method of claim 4, wherein the remainder codebook is selected from at least one remainder codebook based on the K value.

7. The method of claim 4, further comprising the step of presenting the FAX message data to a user of the FAX selective call receiver by displaying a representation of the FAX message data on a display.

8. A selective call terminal, comprising:

a message controller for receiving a subscriber identification number and a FAX message that comprises FAX message data that has been facsimile encoded and compressed according to a facsimile coding scheme;

a decoder for decoding and expanding the FAX message according to the facsimile coding scheme to retrieve the FAX message data;

a message memory for storing message information;

a codebook memory for storing a run-length codebook and at least one remainder codebook;

an efficient encoder, coupled to the decoder, the message memory, and to the codebook memory, for efficiently encoding and compressing the FAX message data to provide an Efficiently Encoded and Compressed (EEC) FAX message, the efficient encoder comprising:

means for computing an K value representing an integer ratio between a resolution of the FAX message data and a preferred resolution, the run-length codebook has been optimized for run-lengths occurring according to a probability distribution of the preferred resolution;

an Integer divider to divide a run-length value from the FAX message data by the K value to result in an integer run-length value and a remainder value;

a controller to select a remainder code from a selected one of the at least one remainder codebook by looking-up the remainder value in the selected one remainder codebook to find the remainder code;

said controller selecting a run-length code from the run-length codebook by looking-up the integer run-length value in the run-length codebook to find the run-length code; and a memory to storing the remainder code and the run-length code in the message memory to represent an EEC run-length code for inclusion in the EEC FAX message;

a paging controller coupled to the message memory and the message controller for processing the EEC FAX message and the subscriber identification number to provide a selective call FAX message destined for at least one FAX selective call receiver; and an output controller coupled to the paging controller and the message memory for transmitting the selective call FAX message for reception by the at least one FAX selective call receiver.

9. A FAX selective call receiver comprising:

a receiver for receiving a selective call FAX message destined for the FAX selective call receiver, the selective call FAX message comprising an Efficiently Encoded and Compressed (EEC) FAX message;

a memory for storing messages;

a codebook memory for storing a run-length codebook and at least one remainder codebook;

a decoder coupled to the receiver, to the codebook memory, and to the memory for efficiently decoding and expanding the EEC FAX message to provide FAX message data, the decoder comprising:

means for computing an K value representing an integer ratio between a resolution identified in the selective call FAX message and a preferred resolution, the run-length codebook in the codebook memory has been optimized for run-lengths occurring according to a probability distribution of the preferred resolution;

a selector to select a remainder value from a selected one of the at least one remainder codebook by looking-up a remainder code from the EEC FAX message in the selected one remainder codebook to find the remainder value;

said selector selecting a run-length value from the run-length codebook by looking-up a run-length code from the EEC FAX message in the run-length codebook to find the run-length value;

a processor to multiply the run-length value by the K value and adding the remainder value to the result of the multiplication to provide a decoded and expanded run-length value; and said memory storing the decoded and expanded run-length value in the memory for providing FAX message data, the FAX message data being presentable to a user of the FAX selective call receiver.

10. The FAX selective call receiver of claim 9, further comprising:

a display coupled to the decoder and to the memory for displaying a representation of the FAX message data to a user of the FAX selective call receiver.

11. In a selective call system, a method of facsimile communication, comprising the steps of:

(a) receiving a subscriber identification number and a FAX message that comprises FAX message data that has been facsimile encoded and compressed according to a facsimile coding scheme;

(b) decoding and expanding the FAX message according to the facsimile coding scheme to retrieve the FAX message data;

(c) efficiently encoding and compressing the FAX message data to provide an Efficiently Encoded and Compressed (EEC) FAX message, the step (c) of efficiently encoding and compressing comprising the steps of:

(c1) Computing a K value representing an integer ratio between a resolution of the FAX message data and a preferred resolution, a run-length codebook has been optimized for run-lengths occurring according to a probability distribution of the preferred resolution;

(c2) Integer dividing a run-length value from the FAX message data by the K value to result in an integer run-length value and a remainder value;

(c3) Selecting a remainder code from a remainder codebook by looking-up the remainder value in a remainder codebook to find the remainder code;

(c4) Selecting a run-length code from the run-length codebook by looking-up the integer run-length value in the run-length codebook to find the run-length code; and (c5) Storing the remainder code and the run-length code in a memory to represent an EEC run-length code for inclusion in the EEC FAX message;

(d) processing, in the selective call terminal, the EEC FAX message and the subscriber identification number to provide a selective call FAX message destined for at least one FAX selective call receiver;

(e) transmitting the selective call FAX message to at least one FAX selective call receiver;

(f) receiving the selective call FAX message at a FAX selective call receiver, the selective call FAX message being destined therefor;

(g) efficiently decoding and expanding the EEC FAX message from the selective call FAX message received by the FAX selective call receiver to provide FAX message data, the step (g) of efficiently decoding and expanding comprising the steps of:

(g1) Computing a K value representing an integer ratio between a resolution identified in the selective call FAX message and a preferred resolution, a run-length codebook in the FAX selective call receiver has been optimized for run-lengths occurring according to a probability distribution of the preferred resolution;

(g2) Selecting a remainder value from a remainder codebook by looking-up a remainder code from the EEC FAX message in a remainder codebook to find the remainder value;

(g3) Selecting a run-length value from the run-length codebook by looking-up a run-length code from the EEC FAX message in the run-length codebook to find the run-length value;

(g4) Multiplying the run-length value by the K value and adding the remainder value to the result of the multiplication to provide a decoded and expanded run-length value; and (g5) Storing the decoded and expanded run-length value in a memory for storing FAX message data; and (h) displaying the FAX message data to a user of the FAX selective call receiver.

* * * * *